United States Patent [19]
Bistrian

[11] Patent Number: 5,993,221
[45] Date of Patent: Nov. 30, 1999

[54] DIETARY FORMULATION COMPRISING ARACHIDONIC ACID AND METHODS OF USE

[75] Inventor: Bruce R. Bistrian, Ipswich, Mass.

[73] Assignee: Beth Israel Deaconess Medical Center, Inc., Boston, Mass.

[21] Appl. No.: 08/847,036

[22] Filed: May 1, 1997

[51] Int. Cl.$^6$ .......................... A61K 47/44; A61K 9/127; A61M 5/00
[52] U.S. Cl. ....................... 434/429; 424/422; 424/450; 514/943
[58] Field of Search ................................. 424/439, 450, 424/422; 426/810, 601; 514/943

[56] References Cited

U.S. PATENT DOCUMENTS

| | | | |
|---|---|---|---|
| 4,820,731 | 4/1989 | Mascioli | 514/549 |
| 5,231,085 | 7/1993 | Alexander | 514/44 |
| 5,308,832 | 5/1994 | Garleb | 514/2 |
| 5,340,594 | 8/1994 | Barclay | 426/49 |
| 5,514,656 | 5/1996 | Cope | 514/21 |
| 5,574,065 | 11/1996 | Trimbo | 514/546 |

FOREIGN PATENT DOCUMENTS

| | | |
|---|---|---|
| 0609001 | 8/1994 | European Pat. Off. . |
| 0615753 | 9/1994 | European Pat. Off. . |
| 90/04013 | 4/1990 | WIPO . |
| 92/12711 | 8/1992 | WIPO . |
| 94/28913 | 12/1994 | WIPO . |
| 96/40106 | 12/1996 | WIPO . |

OTHER PUBLICATIONS

Cabré, E. et al., "Polyunsaturated Fatty Acid Deficiency in Liver Cirrhosis: Its Relation to Associated Protein–Energy Malnutrition (Preliminary Report)", *The American Journal of Gastroenterology*, vol. 83 (7), pp. 712–717 (1988).

Cabré, E. et al., "Polyunsaturated Fatty Acid Deficiency in Liver Diseases: Pathophysiological and Clinical Significance", *Nutrition*, vol. 12 (7/8), pp. 542–548 (1996).

Mendenhall, C. et al., "Protein–Calorie Malnutrition Associated with Alcoholic Hepatitis", *The American Journal of Medicine*, vol. 76, pp. 211–222 (1984).

Mendenhall, C. et al., "VA Cooperative Study on Alcoholic Hepatitis II: Prognostic Significance of Protein–Calorie Malnutrition", *The American Journal of Clinical Nutrition*, vol. 43, pp. 213–218 (1986).

McCullough, A. et al., "Disordered Energy and Protein Metabolism in Liver Disease", *Seminars in Liver Disease*, vol. 11 (4), pp. 265–277 (1991).

Morgan, A. et al., "Nutrition in Cryptogenic Cirrhosis and Chronic Aggressive Hepatitis", *GUT*, vol. 17, pp. 113–118 (1976).

O'Keefe, S. et al., "Malnutrition and Immuno–Imcompetence in Patients with Liver Disease", *Lancet*, vol. 2, pp. 615–617 (1980).

Palombo, J. et al., "Effectiveness of Orthotopic Liver Transplantation on the Restoration of Cholesterol Metabolism in Patients with End–Stage Liver Disease", *Gastroenterology*, vol. 93, pp. 1170–1177 (1987).

*Primary Examiner*—Thurman K. Page
*Assistant Examiner*—Alysia Berman
*Attorney, Agent, or Firm*—Lahive & Cockfield, LLP

[57] ABSTRACT

A novel formulation which contains about 2–60% by calories of a $C_{20}$ or longer $\omega 3$ fatty acid moiety and about 2–60% by calories of an arachidonic acid moiety has been developed. This formulation is particularly useful for restoring arachidonic acid levels, increasing immunity or minimizing risk of infection in critically ill patients, and treating functional essential fatty acid deficiency in patients suffering from end stage liver disease. A structured lipid which has a $C_{20}$ or longer $\omega 3$ fatty acid moiety and an arachidonic acid moiety has also been developed.

24 Claims, No Drawings

DIETARY FORMULATION COMPRISING ARACHIDONIC ACID AND METHODS OF USE

BACKGROUND OF THE INVENTION

Protein calorie malnutrition is a common complicating condition in patients with alcoholic chronic liver disease (Mendenhall et al. *Am J Med* 1984;76:211–222; Mendenhall et al. *Am J Clin Nutr* 1986;43:213–218) and non-alcoholic chronic liver disease (O'Keefe et al. *Lancet* 1980;2:615–617; Morgan et al. *Gut* 1976;17:113–118). Factors contributing to the high prevalence include poor dietary intake, elevated resting energy expenditure, and nutrient malabsorption (McCullough A J and Tavill A S. *Seminars in Liver Disease* 1991;11:265–277). Patients with end stage liver disease complicated by portal hypertension are particularly likely to be malnourished and, when hospitalized, frequently require active nutritional therapy. While the effects of malnutrition in chronic liver disease on fatty acid nutrition have not been extensively studied, because of an increased resting energy expenditure, fat malabsorption and abnormal fat catabolism, these patients may have significant abnormalities in fatty acid metabolism (Cabre et al. *Am J Gastroent* 1988;83:712–717; Palombo et al. *Gastroenterology* 1987;93: 1170–1177). One potential mechanism for such a disturbance would be an inadequate intake of essential fatty acids as part of the global protein calorie malnutrition.

Dietary fatty acids are classified according to their chain length. Long chain fatty acids contain 14 carbons or greater and can be further characterized by the number of double bonds contained in their structure into saturated, monounsaturated and polyunsaturated subgroups. The two fatty acids essential in human nutrition are linoleic acid and alpha-linolenic acid from which polyunsaturated fatty acids of the omega 6 series and omega 3 series are formed through enzymatic desaturation and elongation by the liver. The body cannot convert omega 3 fatty acids to omega 6 fatty acids or vice versa. Patients with advanced liver disease may have an impaired ability to form polyunsaturated fatty acids, including arachidonic and eicosapentaenoic acid, from their essential fatty acid precursors, potentially altering membrane composition and eicosanoid production.

It has now been demonstrated that there is a defect in elongation and desaturation in end stage liver disease, resulting in dramatically reduced levels of the polyunsaturated fatty acids such as arachidonic, eicosapentaenoic, and docosahexaenoic acid. Although there may be some degree of concurrent linoleic acid deficiency, the ratio of linoleic/arachidonate confirms that elongation and desaturation is the limiting factor. Arachidonic acid levels in tissue phospholipids are usually very tightly regulated, such that arachidonic acid levels are stable at varying levels of linoleic acid content in the diet. Only with essential (linoleic) fatty acid deficiency or with the consumption of omega 3 fatty acids in place of omega 6 fatty acids do arachidonic acid levels fall. Given the importance of arachidonic acid in second messenger metabolism, it is reasonable to suspect that some of the untoward side effects of end stage liver disease, including decreased immunocompetence and increased risk of infection and infectious mortality, may be a consequence of functional essential fatty acid deficiency. In the normal diet arachidonic acid is very low, because it is only found in any quantity in the membranes of animal flesh. To add arachidonic acid alone to a diet formulation is problematic, since arachidonic acid supplementation in normal individuals is pro-inflammatory and immunosuppressive. In the alternative, to give eicosapentaenoic acid (EPA) and docosahexaenoic acid (DHA), which provide benefits regarding immunosuppression, would likely lead to a worsening of arachidonic acid levels, and potentially essential fatty acid deficiency.

Thus a need still exists to develop a novel dietary formulation which can normalize membrane composition to accomplish two goals: (1) restore arachidonic acid levels to normal and reverse signs related to essential fatty acid deficiency, and (2) provide added immune-enhancing benefits of EPA and DHA.

Accordingly, an object of the invention is to provide a novel formulation which can restore arachidonic acid levels and which can increase immunity of a subject.

Another object of the invention is to provide a method of restoring arachidonic acid levels in a subject by administering the novel formulation of the invention.

Another object of the invention is to provide a method of increasing immunity or minimizing a risk of infection in a subject by administering the novel formulation of the invention.

Another object of the invention is to provide a method of treating essential fatty acid deficiency in a subject by administering the novel formulation of the invention.

A still further object of the invention is to provide a structured lipid which provides a high energy fat source and fatty acids which assist in fighting infection and treating essential fatty acid deficiency.

These and other objects and features of the invention will be apparent from the following description and from the claims.

SUMMARY OF THE INVENTION

The present invention features a novel formulation which includes about 2–60% of the caloric requirements of a patient with a $C_{20}$ or longer ω3 fatty acid moiety and about 2–60% of the caloric requirements which provides an arachidonic acid moiety. Preferably, the formulation includes about 10–20% by calories of an arachidonic acid moiety highly enriched in arachidonic acid (i.e., 50%) and about 20% by calories of a formula containing substantial amounts of a $C_{20}$ or longer ω3 fatty acid moiety (i.e., certain fish oils). The ω3 fatty acid moiety is selected from the group consisting of an eicosapentaenoic (EPA) acid moiety, a docosahexaenoic (DHA) acid moiety, and mixtures thereof.

The formulation should include a source of carbohydrate. The source of carbohydrates can be any simple or complex carbohydrate, e.g., monosaccharides, disaccharides, or oligosaccharides. Examples of preferred carboxydrates include but are not limited to corn starch, dextrose and glucose.

The formulation further should include a source of protein. The source of protein can be any protein hydrolysate or peptide mixtures of high biologic values, e.g., meat or soy proteins. The protein hydrolysate are preferably partially hydrolyzed in nature and include a substantial fraction of variable chain length peptides, e.g., medium or short chain peptides, e.g., di- and tri-peptides, but has less than about 10% free amino acids, more preferably less than about 5% free amino acids. In a preferred embodiment, only the highest biological value proteins are hydrolyzed, e.g., whey, lactalbumin, casein, egg white, egg solids, soy, or delactosed milk solids. In other preferred embodiments, the protein source is lactose-free, and free amino acids are preferably avoided in the formulation of the invention.

The invention also features formulations which include, in addition to the components described above, vitamins and minerals in accordance with, or approximately, the Recommended Dietary Allowance (RDA), now called the Reference Daily Intake (RDI). The formulation of the invention can also contain nutrients not recommended by the RDA, e.g., nucleotides, beta-carotene, carnitine, and taurine.

The formulation may also include, in addition to the components described above, inactive ingredients such as emulsifiers, artificial sweeteners and/or flavoring. Any formulation preferably includes essential amino acids (albeit not in free form), essential fatty acids, essential and nonessential vitamins and minerals. The formulations of the present invention may be in the form of a dietary supplement or used as a total enteral or parenteral feeding regimen. If the latter, these essential nutrients are required while even in a supplement, the addition insures that the patient is obtaining these nutrients. When the formulation is in the form of a dietary supplement, the formulation should provide about 5–60% of total energy expenditure in terms of calories.

The invention also features a method of restoring arachidonic acid levels in a subject. The method includes administering to the subject the formulation of the invention which includes about 2–60% by calories of a $C_{20}$ or longer $\omega 3$ fatty acid moiety and about 2–60% by calories of an arachidonic acid moiety. This method is particularly useful in treating subjects suffering from chronic liver disease.

In another aspect, the invention features a method of increasing immunity or minimizing a risk of infection in a subject. The method includes administering to the subject the formulation of the invention. The method of the invention is particularly useful for patients who are critically ill for a variety of reasons including surgery, burns, trauma, cancer, AIDS, multistem organ failure, sepsis or inflammatory process which can also impair fatty acid elongation and desaturation. It is also useful for individuals who may have an infection at the time of the administration of the diet or may be at high risk of infection due to some immunocompromise. Individuals at risk of infection include those suffering with secondary immunosuppression due to chemotherapy or diabetes mellitus, protein-malnourished patients, or patients undergoing surgery, e.g., abdominal or thoracic surgery.

In still another aspect, the invention features a method of treating essential fatty acid deficiency in a subject. The method includes administering to the subject the described formulation. Such treatment is beneficial, for example, for improvement in growth, nitrogen balance, vision (where DHA is critical), higher cerebral function, red and white blood cell and platelet function and sodium and fluid balance.

The invention also features a structured lipid which provides a high energy fat source and fatty acids which assist in fighting infection and treating essential fatty acid deficiency. The structured lipid has a glycerol backbone with three fatty acids linked thereto. Preferably, the structured lipid includes at least $\omega 3$ $C_{20}$ or longer $\omega 3$ fatty acid moiety and at least one arachidonic acid moiety. In preferred embodiments, the fatty acid moiety or the arachidonic acid moiety is at position $R_2$. The structured lipid further includes a $C_8$–$C_{12}$ fatty acid moiety, preferably a $C_{12}$ fatty acid moiety. In one preferred embodiment, the $C_8$–$C_{12}$ fatty acid moiety is at position $R_1$ or $R_3$ and the arachidonic acid $C_{12}$ at $R_2$ while in others the $C_8$–$C_{12}$ fatty acid moiety is at position $R_2$.

The following description and non-limiting examples further elucidate the invention.

DETAILED DESCRIPTION OF THE INVENTION

Patients with chronic liver disease have significant abnormalities in fatty acid metabolism which can lead to essential fatty acid deficiency. Hospitalized patients with chronic liver disease have significantly lower omega 3 and omega 6 essential fatty acids and their metabolites compared to control patients. There is evidence of both an acute deficiency as measured by the fatty acid composition of plasma triglyceride and chronic deficiency as reflected by the phospholipid fatty acids. Administering the formulation of the invention to these patients would be beneficial both in restoring arachidonic acid levels to normal and reversing signs related to essential fatty acid deficiency, and providing added immune-enhancing benefits of EPA and DHA. As the result of the administration of the formulation of the invention, essential fatty acid deficiency in tissue is reduced and serum and tissue lipid levels increase.

The formulation of the invention is made by blending the fat fraction, containing at least the $C_{20}$ or longer $\omega 3$ fatty acid moiety and the arachidonic acid moiety, proteins, carbohydrates, and any additional additives, and homogenizing the mixture into a stable emulsion.

Sources for the $\omega 3$ fatty acids are plant oils, marine plankton, fungal oils, and fish oils, preferably menhaden, salmon, anchovy or herring oils. Arachidonic acid is commercially available from Martek, Inc. as a fungal derivative which contains 50% arachidonic acid.

The preferred protein is a protein hydrolysate. The protein hydrolysate may be any suitable partially hydrolyzed protein or protein hydrolysate utilized in a nutritional formula such as soy protein hydrolysate, casein hydrolysate, whey protein hydrolysate, animal and vegetable protein hydrolysates, partially hydrolyzed whey, casein or soy proteins, and mixtures thereof. Soy or casein protein hydrolysates comprising a substantial proportion of variable chain length peptides, e.g., medium chain and short chain peptides, e.g., di- and tri-peptides, but having less than about 10% free amino acids, preferably less than about 5% free amino acids, are preferred. For greatest use, the protein source should be lactose-free so it can be used for lactose intolerant patients.

When choosing a protein source, the biological value of the protein should be considered first, with the highest biological values being found in casein, whey, lactalbumin, egg albumin, and whole egg proteins. Next, the cost should be considered, the lowest cost with the best biological value being the best combination.

The source of carbohydrate may be any simple monosaccharides, disaccharides, oligosaccharides, or complex carbohydrates. Examples include fructose, dextrose, glucose, maltodextrin, corn syrup and corn starch. Carbohydrate sources which may be utilized in the formulation of the invention include hydrolyzed or nonhydrolyzed starches.

Emulsifiers may be added for stability purposes to the formulation of the invention, e.g., emulsifiers such as soybean phospholipids. This may be required for parenteral products.

Flavoring may also be added to the emulsion to make it more palatable for enteral use. Flavoring can be in a form of flavored extracts, volatile oils, chocolate flavoring, peanut butter flavoring, cookie crumbs, vanilla or any commercially available flavoring.

The formulation of invention may also contain a stabilizer such as λ-carrageenan. λ-carrageenan increases the viscosity of the formula without forming a gel structure, thus retarding the precipitation of insoluble calcium and phosphorus salts if included in the formula. Xanthan gum or other standard stabilizers may also be used as a stabilizer in the same fashion as λ-carrageenan.

While the formulation of the invention is preferably provided in a ready-to-feed form, it may also be concentrated by increasing the percent total solids of the formula or made in powder form, both procedures being well known to those skilled in the art. The concentrate or powder are then reconstituted for feeding by adding water (tap or deionized-sterilized water).

The structured lipid of the invention may be manufactured by any conventional means such as transesterification but the use of blocking groups which allow positioning of the residues at specific locations is preferred. Those skilled in the art are familiar with the variety of techniques useful for directing the residues to particular locations and they need not be set forth here in detail. It appears that the use of the $C_{20}$ or longer ω3 fatty acid moiety or more preferably, the arachidonic acid moiety in the $R_2$ position with $C_8$–$C_{12}$ fatty acid moiety, preferably a $C_{12}$ fatty acid moiety, in the $R_1$ or $R_3$ positions leads to a most preferred triglyceride. The preferred triglyceride improves absorption into the body as a whole and allows for ease of incorporation of the long chain fatty acid found at the $R_2$ position. In another preferred embodiment, it appears that the use of a $C_8$–$C_{12}$ fatty acid moiety, preferably a $C_{12}$ fatty acid moiety, at $R_2$ position results in endogenous formation of the structured lipid in intestinal cells.

Certain terms used herein are described below for clarity.

As used herein, the term "$C_{20}$ or longer ω3 fatty acid moiety" refers to eicosapentaenoic (EPA) acid moiety, docosahexaenoic (DHA) acid moiety, or mixtures thereof.

As used herein, the term "critically ill patients" refers to patients who are suffering from a total or partial dysfunction of the gastro-intestinal tract due to disease or stress of injury such as surgery, cancer, acute diabetes, AIDS, malnutrition, trauma or sepsis. The term "critically ill patients", as used herein, is also intended to include hypercatabolic patients. These critically ill individuals are often hospitalized and must receive most or all of their daily nutritional requirements parenterally and/or enterally in order to sustain protein synthesis and to minimize the likelihood of becoming malnourished, to maintain nutritional status, or to improve nutritional status.

As used herein, the term "patients suffering from chronic liver disease" refers to patients who are suffering from alcoholic liver cirrhosis, liver cirrhosis caused by chronic infection after acute inflammation of the liver or immunologic liver diseases characterized by chronic inflammation without known reason. Metabolic derangements associate with chronic liver disease include, but are not limited to: increased plasma glucagon; hyperinsulinemia; increased plasma epinephrine and cortisol; decreased liver and muscle carbohydrate stores; accelerated gluconeogenesis; hypoglycemia; hyperammonemia; increased plasma aromatic amino acid; increased plasma methionine, glutamine, asparigine and histidine; and decreased plasma branched chain amino acids.

EXAMPLE 1

This Example describes serum lipid levels by lipid type resulting from feeding four different diets (sunflower oil diet, sunflower oil diet with AA supplementation, fish oil diet, and fish oil diet with AA supplementation) to normal rats. The results are outlined in Table 1 below.

TABLE 1

| | % bywt of total fatty acids | | | |
|---|---|---|---|---|
| Fatty acids # of patients | Sunflower (9) | Sun + AA (8) | Fish (9) | Fish + AA (7) |
| 16:0 | 24.26 ± 0.77 | 24.70 ± 0.58 | 29.84 ± 0.78 | 29.21 ± 0.54 |
| 16:1w7 | 0.13 ± 0.02 | 0.19 ± 0.05 | 0.64 ± 0.06 | 0.47 ± 0.04 |
| 18:0 | 26.96 ± 0.59 | 24.94 ± 1.39 | 22.04 ± 0.76 | 21.38 ± 0.36 |
| 18:1w9 (c) | 2.73 ± 0.12 | 3.49 ± 0.26 | 7.65 ± 0.65 | 5.68 ± 0.27 |
| 18:1w9 (t) | 1.28 ± 0.12 | 1.43 ± 0.10 | 2.05 ± 0.10 | 1.69 ± 0.09 |
| 18:2w6 | 14.31 ± 0.95 | 11.76 ± 1.46 | 3.46 ± 0.23 | 2.22 ± 0.34 |
| 18:3w3 | 0.02 ± 0.01 | 0.07 ± 0.03 | 0.01 ± 0.01 | 0.09 ± 0.03 |
| 20:0 | 0.04 ± 0.02 | 0.06 ± 0.03 | 0.01 ± 0.01 | 0.04 ± 0.02 |
| 20:1w9 | 0.02 ± 0.01 | 0.05 ± 0.02 | 0.01 ± 0.01 | 0.05 ± 0.02 |
| 20:2w6 | 0.24 ± 0.04 | 0.24 ± 0.04 | 0.12 ± 0.12 | 0.03 ± 0.01 |
| 20:3w9 | 0.17 ± 0.04 | 0.12 ± 0.04 | 0.02 ± 0.02 | 0.07 ± 0.03 |
| 20:3w6 | 0.29 ± 0.05 | 0.26 ± 0.02 | 0.88 ± 0.07 | 0.41 ± 0.02 |
| 20:4w6 (AA) | 25.50 ± 0.82 | 26.78 ± 1.18 | 11.56 ± 2.07 | 26.37 ± 2.09 |
| 22:0 | 0.49 ± 0.07 | 0.55 ± 0.05 | 0.18 ± 0.06 | 0.36 ± 0.01 |
| 22:1w9 | 0.43 ± 0.01 | 0.08 ± 0.03 | 0.19 ± 0.06 | 0.14 ± 0.03 |
| 20:5w3 (EPA) | 0.00 ± 0.00 | 0.02 ± 0.02 | 6.28 ± 0.98 | 1.25 ± 0.13 |
| 24:0 | 0.80 ± 0.06 | 0.89 ± 0.04 | 0.74 ± 0.15 | 0.83 ± 0.04 |
| 24:1w9 | 0.34 ± 0.05 | .041 ± 0.03 | 1.01 ± 0.12 | 0.74 ± 0.05 |
| 22:5w3 | 0.38 ± 0.06 | 0.55 ± 0.13 | 1.92 ± 0.10 | 1.48 ± 0.08 |
| 22:6w3 | 2.00 ± 0.23 | 2.68 ± 0.78 | 11.40 ± 0.65 | 8.49 ± 0.70 |
| total w3 | 2.39 ± 0.28 | 3.40 ± 0.98 | 19.61 ± 1.29 | 11.22 ± 0.67 |
| 20:5w3/20:4 w6 | 0.00 ± 0.00 | 0.00 ± 0.01 | 0.68 ± 0.41 | 0.05 ± 0.01 |
| 22:5w3/20:4 w6 | 0.01 ± 0.01 | 0.02 ± 0.02 | 0.19 ± 0.06 | 0.06 ± 0.01 |
| 22:6w3/20:4 w6 | 0.08 ± 0.03 | 0.10 ± 0.09 | 0.99 ± 0.31 | 0.34 ± 0.09 |

AA = arachidonic acid

The sunflower oil diet which was fed to nine rats consists mainly of ω6 fatty acids (i.e., linoleic). Although this diet maintains high linoleic acid levels which leads to high arachidonic acid levels, rats can experience problems as this diet provides high ω6 fatty acid and AA levels which can lead to or make worse immunosuppression. Arachidonic acid supplementation to sunflower oil did not result in further increase in AA levels probably due to a negative feedback system.

The fish oil diet which was fed to nine rats results in high ω3 fatty acid (i.e., EPA) levels and very low AA levels (ω6 fatty acids). However, AA levels are totally restored by arachidonic acid supplementation to fish oil (while maintaining elevated EPA levels). The fish oil diet with or without AA contains high EPA levels. Therefore, fish oil diet supplemented with AA is most suitable for patients suffering from chronic liver disease who not only require AA supplementation but can also benefit from immune boost provided by EPA.

EXAMPLE 2

This Example describes data in humans showing that parenteral infusion of soybean oil with total parenteral nutrition could not correct arachidonic acid levels in serum phospholipids of patients with end stage liver disease. This illustrates the necessity of the combination product of the invention.

Materials and Methods

Patient Population

For a 6 month period Patients with end stage liver disease requiring central parenteral nutrition were studied. Baseline hematology and serum chemistries as well as plasma for fatty acid analysis were obtained prior to the initiation of parenteral nutrition. Patients received a standard feeding formula, which is initially a dilute formula for intravenous feeding with rapid advancement to a goal of 22 to 25 kcal/kg and 1–1.5 g/kg/day of amino acids given as Aminosyn®. Acutely encephalopathic patients were given a branched chain amino acid enriched solution formulated by mixing Branchamin® with Aminosyn® to provide a final formula containing 50% branched chain amino acids. Lipid (Intralipid®) as a soybean oil emulsion was infused as a total nutrient admixture in amounts not exceeding 30% of the total energy intake. Linoleic and alpha linolenic acids comprised 54.5% and 8.3% of the total lipid calories respectively. The total calories delivered were adjusted according to the clinical status and were often limited by volume restrictions in individual patients. Morning plasma blood samples were analyzed for triglyceride and phospholipid fatty acid content on a weekly basis or on termination of parenteral nutrition. The triglyceride fraction was chosen to reflect recent intake and the phospholipid fraction to reflect tissue stores. The severity of underlying liver disease was classified according to Child and Pugh (Pugh et al. *BR J Surg* 1973;60:646–649).

Control Population

The baseline date of thirty five adult patients between 18 and 80 years of age with upper gastrointestinal malignancies who were part of a separate study were used as controls. All control patients were admitted for elective surgery. Although there was no patient with chronic liver disease by history or with reduced synthetic function, there was a subgroup of these patients with biliary obstruction due to underlying pancreatic or cholangiocarcinoma. Baseline hematology, serum chemistries and plasma for phospholipid and triglyceride fatty acid analysis as in the prestudy population were drawn prior to surgery.

Fatty Acid Analysis

Lipids were extracted from plasma with chloroform/methanol (2:1, vol/vol). The plasma triglyceride and phospholipid fatty acid profiles were measured using techniques previously described (Pugh et al. *BR J Surg* 1973;60:646–649; Lopes et al. *Am J Clin Nutr* 1991;53:628–637).

Statistical Analysis

All result are expressed as mean±standard deviation. An unpaired two way Students t test was used to compare the baseline fatty acid compositions of control and liver disease patients. A paired t test was used to compare the changes in fatty acid profiles pre and post intravenous supplementation.

Results

During the 6 month study period, 13 patients were admitted with severe chronic liver disease and severe malnutrition requiring parenteral nutritional support. Four of these patients were excluded from the study due to death or liver transplantation within the first 48 hours of admission. In the remaining nine patients, the underlying liver disease was due to ethanol in 5/9 cases and 8/9 were Child's, Class C (see Table 2 below).

TABLE 2

Characteristics of Liver Disease Patients

| Patient Number | Age (Years) | Sex | Causes of Liver Disease | Child's Class |
|---|---|---|---|---|
| 1 | 30 | M | Ethanol | C |
| 2 | 37 | F | Primary sclerosing cholangitis | C |
| 3 | 55 | M | Alpha 1 antitrypsin deficiency | C |
| 4 | 59 | M | Ethanol | C |
| 5 | 36 | F | Chronic rejection after liver transplantation | C |
| 6 | 59 | M | Cryptogenic | C |
| 7 | 63 | F | Ethanol | B |
| 8 | 52 | M | Ethanol | C |
| 9 | 54 | M | Ethanol | C |

All patients had at least one of the following complications of portal hypertension: ascites refractory to diuretic therapy, hepatic encephalopathy, or bleeding esopheal varices.

The control population consisted of 35 patients admitted electively for surgical procedures for upper gastrointestinal malignancy. These patients were not considered severely malnourished, as they were 111±21% of their ideal body weight and 93±6% of their usual body weight.

Table 3 below compares the clinical and laboratory characteristics of the control patients with those of the liver disease patients.

TABLE 3

Baseline Clinical Characteristics and Laboratory values of Liver Disease and Control Patients

| | Age (Years) | Sex (M/F) (%) | Hemoglobin (g/dl) | Bilirubin (mg/dl) | Prothrombin Time (sec) | Albumin (g/dl) |
|---|---|---|---|---|---|---|
| Control (n = 35) | 64 ± 13 | 74/26 | 12.8 ± 2.1 | 0.6 ± 0.2# | 12.1 ± 0.6 | 3.7 ± 0.6 |
| Liver Disease (n = 9) | 49 ± 11.9* | 67/33 | 10.6 ± 0.8* | 18.4 ± 12.8* | 20.4 ± 4.1* | 2.2 ± 0.3* | mean in patients who did not have obstruction of the biliary tract (n = 25)
*p < 0.05

The liver disease patients were younger and had biochemical evidence of severe hepatic dysfunction as measured by bilirubin and prothrombin time. They were also significantly hypoalbuminemic.

The baseline fatty acid profiles of the plasma triglycerides and plasma phospholipids are shown in Table 4 below.

TABLE 4

Baseline Fatty Acid Profiles of Plasma Triglycerides and Phospholipids in Liver Disease Patients and Controls

| Common Name | Fatty Acid | Plasma Triglycerides (wt %) | | Plasma Phospholipids (wt %) | |
|---|---|---|---|---|---|
| | | Control | Liver Disease | Control | Liver Disease |
| Palmitic | 16:0 | 25.0 ± 6.3 | 37.5 ± 3.8* | 32.0 ± 4.5 | 41.3 ± 3.2* |
| Palmitoleic | 16:1 ω-7 | 3.6 ± 1.8 | 8.3 ± 2.6* | .84 ± .73 | 3.1 ± 1.1* |
| Stearic | 18:0 | 4.7 ± 4.1 | 2.8 ± 1.7* | 13.4 ± 1.5 | 10.4 ± 2.2 |
| Oleic | 18:1 ω-9 | 36.6 ± 8.1 | 38.7 ± 5.2 | 11.0 ± 2.9 | 14.0 ± 1.6* |
| Linoleic | 18:2 ω-6 | 22.3 ± 6.3 | 9.9 ± 2.8* | 20.8 ± 2.9 | 15.4 ± 3.4* |
| Alpha Linolenic | 18:3 ω-3 | .75 ± .73 | 0.0 ± 0.0* | .08 ± .10 | .02 ± 0.5* |
| Eicosenoic | 20:1 ω-9 | .35 ± .88 | .17 ± .49 | .08 ± .12 | .37 ± .44* |
| Eicosadienoic | 20:2 ω-6 | .20 ± .29 | 0.0 ± 0.0* | .22 ± .16 | .07 ± .11* |
| Dihomogammalinolenic | 20:3 ω-6 | .38 ± .86 | 0.0 ± 0.0* | 2.6 ± .78 | 1.3 ± .4* |
| Arachidonic | 20:4 ω-6 | 2.0 ± 1.0 | .60 ± .55* | 10.6 ± 2.7 | 8.1 ± 1.7* |
| Eicosapentaenoic | 20:5 ω-3 | .15 ± .20 | 0.0 ± 0.0* | .68 ± .60 | .04 ± .06* |
| Docosapentaenoic | 22:5 ω-3 | .34 + .39 | 0.0 ± 0.0* | .78 ± .39 | .40 ± .49* |
| Docosahexaenoic | 22:6 ω-3 | .50 ± 1.1 | 0.0 ± 0.0 | 3.3 ± 1.2 | 1.2 ± .5* |
| | Σω-3 | .50 ± 1.1 | 0.00 ± 0.00* | 4.9 ± 1.7 | 1.7 ± 1.0* |
| | Σω-6 | 25.0 ± 6.9 | 10.6 ± 2.6* | 34.2 ± 3.8 | 24.9 ± 4.7* |
| | Σω-9 | 37.2 ± 7.7 | 39.0 ± 5.0 | 12.4 ± 2.8 | 15.3 ± 1.5 |

*$p < 0.01$

The liver disease patients had no detectable linolenic acid or other omega 3 series fatty acids, and markedly diminished linoleic acid and omega 6 series fatty acids, in the triglyceride fraction. However, eicosatrienoic acid (18.3 ω9), the appearance of which reflects essential fatty acid deficiency, was not detected. These findings presumably reflect their limited recent dietary intake and to a lesser extent the limited tissue stores of both essential fatty acids. The saturated fatty acid, palmitic acid, was increased relative to the other fatty acids in the liver disease group presumably as a compensatory effect. The plasma phospholipids, which best reflect membrane composition, demonstrated similar trends as the triglyceride fraction, although omega 3 fatty acids were found in markedly reduced amounts.

The mean volume of TPN infused was 1333±353 ml/24 hours (range 1000 ml–2000 ml) administered for an average of 7.9±4 days (range 3–15 days). The total nutrient admixture (mean±SD) consisted of 69±20 g protein (range 60–105 g), 209±45 g carbohydrate (range 140–300 g), and 33±7 g fat (range 20–40 g). The total energy delivered per 24 hours (mean±SD) was 1284±249 kcal (range 946–1472 kcal.)

Table 5 below outlines the relative fatty acid profiles of the liver disease group before and after supplementation with intravenous lipid.

TABLE 5

Fatty Acid Profile of Plasma Triglyceride and Phospholipid in Liver Disease Patients at Baseline and after Parenteral Lipid Supplementation

| | Plasma Triglycerides (wt %) | | Plasma Phospholipids (wt %) | |
|---|---|---|---|---|
| Fatty Acid | Baseline | Post Lipid Supplementation | Baseline | Post Lipid Supplementation |
| 16:0 | 37.5 ± 3.8 | 37.2 ± 10.0 | 41.3 ± 3.2 | 38.8 ± 8.8 |
| 16:1 ω-7 | 8.3 ± 2.6 | 5.7 ± 3.2 | 3.1 ± 1.1 | 2.4 ± 1.2 |
| 18:0 | 2.8 ± 1.7 | 3.6 ± 1.3 | 10.4 ± 2.2 | 10.7 ± 2.3 |
| 18:1 ω-9 | 38.7 ± 5.2 | 29.3 ± 7.5* | 14.0 ± 1.6 | 15.6 ± 3.6 |
| 18:2 ω-6 | 9.9 ± 2.8 | 20.7 ± 9.4* | 15.4 ± 3.4 | 15.7 ± 3.5 |
| 18:3 ω-3 | 0.0 ± 0.0 | 1.1 ± 1.7 | .02 ± .05 | 1.4 ± 2.6 |
| 20:1 ω-9 | .17 ± .49 | 0.00 ± 0.00 | .37 ± .44 | 2.5 ± 3.0* |
| 20:2 ω-6 | 0.0 ± 0.0 | 0.0 ± 0.0 | .07 ± .11 | 1.6 ± 2.7 |
| 20:3 ω-6 | 0.0 ± 0.0 | 0.0 ± 0.0 | 1.3 ± .4 | 1.0 ± 0.6 |
| 20:4 ω-6 | .60 ± .55 | .18 ± .36 | 8.1 ± 1.7 | 7.5 ± 2.5 |
| 20:5 ω-3 | 0.0 ± 0.0 | 0.0 ± 0.0 | 04 ± .06 | 0.1 ± 0.2 |
| 22:5 ω-3 | 0.0 ± 0.0 | 0.0 ± 0.0 | .40 ± .49 | 0.24 ± 0.34 |
| 22:6 ω-3 | 0.0 ± 0.0 | 0.0 ± 0.0 | 1.2 ± .5 | 0.93 ± 0.51 |
| Σω-3 | 0.00 ± 0.00 | 1.1 ± 1.7 | 1.7 ± 1.0 | 2.6 ± 2.8 |
| Σω-6 | 10.6 ± 2.6 | 20.8 ± 9.3* | 24.9 ± 4.7 | 25.7 ± 4.5 |
| Σω-9 | 39.0 ± 5.0 | 29.3 ± 7.5* | 15.3 ± 1.5 | 18.7 ± 5.5 |

*$p < 0.05$

There was a significant increase in the linoleic acid post supplementation in the triglyceride fraction and a corresponding decrease in the oleic acid subfraction. These changes were sufficiently large to cause a significant increase in the sum of omega 6 fatty acids and a fall in omega 9 fatty acids. Alpha linolenic acid became detectable post infusion. There were, however, no other significant differences in any of the other fatty acids compared with baseline. The appearance of the essential fatty acids alpha linolenic and linoleic in the triglyceride fraction after infusion did not have any impact on the plasma phospholipid profile of omega 3 and omega 6 fatty acids.

The data demonstrate a moderate deficiency of essential fatty acids and their polyunsaturated end products in patients with severe chronic liver disease. These deficiencies may have clinical importance and are not reversed with short term intravenous supplementation with a linoleic acid-rich lipid emulsion in the amounts conventionally given.

The foregoing examples are purely illustrative and are not intended to be the limitation of the invention. Those skilled in the art can determine other modifications on the diet used herein. Such modifications which are included within the following claims.

What is claimed is:

1. A novel dietary formulation in the form of an oil emulsion providing total enteral or parenteral nutrition comprising:

about 2–60% by calories of a $C_{20}$ or longer ω3 fatty acid; and about 2–60% by calories of arachidonic acid, said fatty acids providing 5–60% of the total calories of said dietary formulation.

2. The formulation of claim 1, wherein said formulation comprises about 10–20% by calories of arachidonic acid.

3. The formulation of claim 1, wherein said formulation comprises about 20% by calories of a $C_{20}$ or longer ω3 fatty acid.

4. The formulation of claim 1, wherein said ω3 fatty acid is selected from the group consisting of an eicosapentaenoic (EPA) acid, a docosahexaenoic (DHA) acid, and mixtures thereof.

5. The formulation of claim 1, wherein said formulation further comprises a source of carbohydrate.

6. The formulation of claim 5, wherein said source of carbohydrate is selected from the group consisting of corn starch, dextrose and glucose.

7. The formulation of claim 1, wherein said formulation further comprises a source of protein.

8. The formulation of claim 7, wherein said source of protein is selected from the group consisting of protein hydrolysates and amino acid mixtures.

9. The formulation of claim 1, wherein said formulation further comprises an emulsifier.

10. The formulation of claim 1, wherein said formulation further comprises a source of vitamins and minerals.

11. The formulation of claim 1, wherein said formulation is a parenteral formulation.

12. A method of restoring arachidonic acid levels in a subject comprising administering to said subject a dietary formulation in the form of an oil emulsion providing total enteral or parenteral nutrition comprising about 2–60% by calories of a $C_{20}$ or longer ω3 fatty acid and about 2–60% by calories of arachidonic acid, said fatty acids providing 5–60% of the total calories of said dietary formulation.

13. The method of claim 12, wherein said subject is suffering from chronic liver disease.

14. A method of increasing immunity of a subject comprising administering to said subject a dietary formulation in the form of an oil emulsion providing total enteral or parenteral nutrition comprising about 2–60% by calories of a $C_{20}$ or longer ω3 fatty acid and about 2–60% by calories of arachidonic acid, said fatty acids providing 5–60% of the total calories of said dietary formulation.

15. A method of minimizing a risk of infection in a subject comprising administering to said subject a dietary formulation in the form of an oil emulsion providing total enteral or parenteral nutrition comprising about 2–60% by calories of a $C_{20}$ or longer ω3 fatty acid and about 2–60% by calories of arachidonic acid, said fatty acids providing 5–60% of the total calories of said dietary formulation.

16. The method of claim 15, wherein said subject is critically ill.

17. A method of treating essential fatty acid deficiency in a subject comprising administering to said subject a dietary formulation in the form of an oil emulsion providing total enteral or parenteral nutrition comprising about 2–60% by calories of a $C_{20}$ or longer ω3 fatty acid and about 2–60% by calories of arachidonic acid, said fatty acids providing 5–60% of the total calories of said dietary formulation.

18. The method of claim 17, wherein said treatment is beneficial for growth, nitrogen balance, vision, higher cerebral function, red and white blood cell and platelet function and sodium and fluid balance.

19. A novel dietary formulation in the form of an oil emulsion comprising:

about 10–20% by calories of a $C_{20}$ or longer ω3 fatty acid; and about 10–20% by calories of arachidonic acid.

20. The formulation of claim 19, wherein said ω3 fatty acid is selected from the group consisting of an eicosapentaenoic (EPA) acid, a docosahexaenoic (DHA) acid, and mixtures thereof.

21. A method of restoring arachidonic acid levels in a subject comprising administering to said subject a dietary formulation in the form of an oil emulsion comprising about 10–20% by calories of a $C_{20}$ or longer ω3 fatty acid and about 10–20% by calories of arachidonic acid.

22. A method of increasing immunity of a subject comprising administering to said subject a dietary formulation in the form of an oil emulsion comprising about 10–20% by calories of a $C_{20}$ or longer ω3 fatty acid and about 10–20% by calories of arachidonic acid.

23. A method of minimizing a risk of infection in a subject comprising administering to said subject a dietary formulation in the form of an oil emulsion comprising about 10–20% by calories of a $C_{20}$ or longer ω3 fatty acid and about 10–20% by calories of arachidonic acid.

24. A method of treating essential fatty acid deficiency in a subject comprising administering to said subject a dietary formulation in the form of an oil emulsion comprising about 10–20% by calories of a $C_{20}$ or longer ω3 fatty acid and about 10–20% by calories of arachidonic acid.

* * * * *